3,365,360
CONTROLLING SOIL NEMATODES BY CONTACT WITH NON-PHYTOTOXIC NEMATOCIDAL AMOUNTS OF CERTAIN N - ARYL THIOUREAS
Harold M. Taylor, Indianapolis, Ind., assignor to Eli Lilly and Company, Indianapolis, Ind., a corporation of Indiana
No Drawing. Filed July 25, 1966, Ser. No. 567,408
5 Claims. (Cl. 167—30)

ABSTRACT OF THE DISCLOSURE

Nematodes which attack chlorophyllaceous plant materials are selectively controlled by contacting the nematodes with certain N-arylthioureas.

---

This invention relates to a novel method for controlling the nematode population in agricultural soils and protecting chlorophyllaceous plant materials subject to attack by soil nematodes.

Nematodes are found in temperature and tropical regions in all types of soil at depths down to five feet or more below the surface. It is difficult to control the nematode population, particularly in soils used for agricultural purposes, because of the exacting requirements for effective nematode control agents. For example, the ideal nematocidal agent should be toxic to the nematode upon absorption or contact; it must be essentially non-toxic to the plant life grown in the same soil; and it should persist in the soil for a considerable period of time. This last requirement is a particularly difficult one to meet since the chemical employed as a nematocide must thus be not only relatively nonvolatile but also resistant to microbial degradation. Most of the nematocidal compounds of the prior art have been halogenated hydrocarbons of the type commonly used as fumigants. These compounds, while effective, have had several disadvantages, among which have been a substantial toxicity for both plant and animal life and an excessively high vapor pressure causing a lack of persistence in the soil.

It is an object of this invention to provide a method of controlling nematodes in agricultural soils by employing a class of chemical compounds capable of fulfilling the above-enumerated requirements for a nematode control agent and avoiding the above-mentioned disadvantages.

In fulfillment of the above and other objects, this invention provides a method of controlling nematodes in agricultural soils infested therewith which comprises adding to and mixing with said soil a nematocidal amount of a thiourea having the formula:

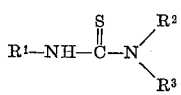

wherein

R¹ is phenyl or naphthyl;
R² is hydrogen, lower alkyl, $C_3$–$C_6$ cycloalkyl, phenyl, or benzyl; and
R³ is hydrogen, lower alkyl, $C_3$–$C_6$ cycloalkyl, or benzyl.

Naphthyl can be illustratively α-naphthyl or β-naphthyl.
Lower alkyl can be illustratively methyl, ethyl, n-propyl, isopropyl, n-butyl, isobutyl, sec.-butyl, or tert.-butyl.
$C_3$–$C_6$ cycloalkyl means saturated cyclic aliphatic hydrocarbon radicals having three to six carbons in the ring and can be illustratively cyclopropyl, cyclobutyl, cyclopentyl, and cyclohexyl.

While the compounds useful in the processes and compositions of the present invention have been defined in terms of a structural formula which depicts the structural features of the said compounds and which indicates the presence therein of certain well-known organic radicals, including alkyl, phenyl, and naphthyl, it will be recognized by those skilled in the art that such radicals may bear one or more substituents without departing in any way from the spirit of the invention and without altering the properties of the compounds useful in the novel processes and compositions in such a way as would set them apart from the invention or take them outside its scope. Compounds having the structure defined above and bearing such substituents are accordingly to be considered as equivalents of the unsubstituted compounds. Among such substituent atoms and radicals are halo, hydroxy, lower alkyl, methoxy, methylmercapto, cyano, acetyl, trifluoromethyl, nitro, and the like.

Illustrative thioureas useful in the nematocidal processes of this invention include but are not limited to the following compounds:

1-phenyl-3,3-diisopropylthiourea
1-(α-naphthyl)-3,3-diisopropylthiourea
1-(o-tolyl)-3,3-diisopropylthiourea
1-(α-naphthyl)-3,3-di-n-butylthiourea
1-phenyl-3,3-di-n-butylthiourea
1-phenyl-3,3-di-sec.-butylthiourea
1-phenyl-3,3-dicyclohexylthiourea
1-phenyl-3-cyclohexyl-3-(β-hydroxypropyl)thiourea
1,3-diphenyl-3-ethylthiourea
1-(2,4-dichlorophenyl)-2-thiourea In the novel processes of this invention, a thiourea compound represented by the above formula is applied to the soil at the rate of from about 4 to about 256 lb. per acre. The compounds can be applied to the soil directly or they can be diluted with various inert solid or liquid diluents and then applied to the nematode-infested area. The preferred level of application of a nematocidal thiourea to soils of average nematode infestation is from about 16 to about 128 lb. per acre.

Since the subject thioureas are relatively insoluble in water, they are conveniently formed into nematocide compositions by extending them with a carrier material or conditioning agent of the kind used and commonly referred to in the art as a nematocidal adjuvant or modifier. The adjuvants are inert solids, hydrocarbon liquid diluents, and surface-active agents. They provide compositions adapted for ready and efficient application using conventional applicator equipment. Broadly speaking, the nematocidal composition may contain the active ingredient in a proportion ranging from about 1 to about 95 percent by weight.

Solid compositions can be in the form of powders, suitably homogeneous powders that can be used as such, diluted with inert solids to form dusts, or suspended in a suitable liquid medium for spray applications. The powders usually comprise the active ingredient admixed with suitable amounts of conditioning agents. Natural clays and other powdered carriers can be used, such as attapulgite, china clay, diatomaceous earth, synthetic fine silica, calcium silicate, and other inert solid carriers of the kind conventionally employed. For conversion of the powders to dusts, talc, pyrophyllite, volcanic ash, and other dense, rapid-settling, inert solids customarily are used. Preferably, such powder compositions are used promptly after being made.

The use of the defined thiourea compounds as nematode control agents can be illustrated by the following procedure. A test soil is prepared by thoroughly mixing one part of fine white sand and one part of oven-dried masonry sand. The resulting mixture is not sterilized. Fifteen milligrams of the subject thiourea are weighed out and placed in a clean, dry 7-ounce jar. To the material is added 0.5 ml. of ethanol; the volume is brought up to 4 ml. with aqueous 0.1 percent polyoxyethylene sorbitan mono-oleate solution, and 3 g. of granulated diatomaceous earth are added to the solution and mixed carefully. One hundred grams of the previously prepared sandy soil are then added to the jar, and the jar is rolled for about 10 minutes to thoroughly mix the test compound with the sandy soil. Five milliliters of a nematode inoculum in the form of macerated galls and egg masses from tomato roots infested with *Meloidogyne incognita acrita* (Southern root-knot nematode) are added to the treated sandy coil in the jar and the jar is shaken thoroughly to distribute the inoculum throughout the soil. The jar is then placed on a shelf in the incubation room at about 78° F. At the end of seven days, the jar is removed from the incubation room and the treated nematode-infested soil is removed from the jar and placed in two and one-half inch O.D. plastic pots. Six seeds of Green Prolific variety of cucumber are planted in each pot. The plastic pots are placed in two and one-half inch I.D. clay pots which are permanently embedded in sand on a greenhouse bench. The bench is bottom heated and receives supplemental lighting from time-controlled fluorescent lights. The greenhouse temperature is set at 78° F. All the pots are watered as necessary. At the end of the fifth day following the planting of the seeds, the pots are checked and if no seedlings are evident, the pots are reseeded. At the end of the 28th day following seeding and reseeding, the disease ratings are recorded. The seedlings are removed from the soil and the roots examined for nematode galls. Disease ratings are given according to the number of nematode galls and severity of the infection. Control jars containing no nematocides and control jars containing commercially available nematocides are also subjected to the nematode tests. Chart 1, which follows, gives the results of the tests. In the chart, Column 1 gives the name of the compound in the test; Column 2, the plant disease rating at an application rate of 256 lb. per acre; and Columns 3, 4, 5, and 6, the disease ratings corresponding to application rates of 128, 64, 32, and 16 lb. per acre, respectively.

The following rating scale is employed: rating of 1—severe disease indistinguishable from the untreated control; rating of 2—moderately severe disease; rating of 3—moderate disease; rating of 4—slight disease; rating of 5—no disease.

CHART 1

| Nematocidal Compound | Disease Ratings at lb./acre | | | | |
|---|---|---|---|---|---|
| | 256 | 128 | 64 | 32 | 16 |
| 1-phenyl-3,3-diisopropylthiourea | 5 | 5 | 5 | 5 | 5 |
| 1-(α-naphthyl)-3,3-diisopropyl-thiourea | | 5 | 5 | 5 | 3 |
| 1-isopropyl-1-methyl-3-phenyl-thiourea | | 5 | 4 | 3 | 3 |
| 1-phenyl-3,3-di-n-propylthiourea | 5 | 5 | 5 | 1 | 1 |
| 1-phenyl-3,3-di-n-butylthiourea | 5 | 5 | 5 | 5 | 1 |
| 1-phenyl-3,3-dicyclohexylthiourea | 5 | 5 | 5 | 5 | 5 |
| 1-phenyl-3-cyclohexyl-3-(β-hydroxyethyl)thiourea | 5 | 3 | 3 | 1 | 1 |

One of the compounds included within the scope of the above formula, 1-phenyl-3,3-diisopropylthiourea, was field-tested for its ability to control *Meloidogyne incognita acrita* (Southern root-knot nematode) on cucumbers by the following procedure: field plots 2 by 10 feet in size were infested with sand and root debris known to contain nematode larvae and eggs. The thiourea compound was sprayed on the surface of the soil of two plots and each plot immediately tilled to mix the compound into the soil to a depth of 4 to 5 inches. The amounts of 1-phenyl-3,3-diisopropylthiourea employed on the test plots were equivalent to application rates of 4 and 16 lb. per acre, and two plots were used as controls. In one of the control plots, no nematode inoculum was added, and in the other, a nematode-inoculum was added but no nematode-control chemical was used. The cucumber seeds were planted immediately after incorporation of the chemical. The cucumber plants were permitted to germinate and grow for a period of 60 days, after which time the roots of each plant were examined for root-knot nematode infection. The same rating scale, using ratings from 1 to 5, was employed to estimate the amount of nematode infection as in the previous procedure. Chart 2, which follows, gives the results of this field trial. In the chart, Column 1 gives the name of the compound used; Column 2 gives the application rates of the compound; and Column 3 gives the disease ratings at the respective application rates.

CHART 2

| Nematocidal Compound | Dosage, lb./acre | Disease Rating |
|---|---|---|
| 1-phenyl-3,3-diisopropylthiourea | 4 | 4 |
| | 16 | 4 |
| None (Inoculated check) | 0 | 1 |
| None (Uninoculated check) | 0 | 1 |

The compounds useful in the novel methods and compositions of this invention are prepared by methods well known to the art.

Illustratively, an aryl isothiocyanate such as phenylisothiocyanate is allowed to react with stirring with an appropriate primary or secondary amine at around ambient room temperature. The reaction mixture becomes warm and thickens, and the product crystallizes on standing at room temperature. The crude reaction product is recrystallized from a suitable solvent to yield the substituted thiourea.

I claim:
1. The method of controlling the nematode population in an agricultural soil which comprises contacting said nematodes with a nematocidally effective amount of a nematocidal compound of the formula:

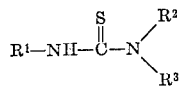

wherein
$R^1$ is phenyl or naphthyl;
$R^2$ is hydrogen, lower alkyl, $C_3$–$C_6$ cycloalkyl, phenyl, or benzyl; and
$R^3$ is hydrogen, lower alkyl, $C_3$–$C_6$ cycloalkyl, or benzyl; said amount being essentially nontoxic to the plant life grown in the said soil.

2. A method as in claim 1 wherein said compound is 1-phenyl-3,3-diisopropylthiourea.

3. A method as in claim 1 wherein said compound is 1-(4-chlorophenyl)-3,3-diisopropylthiourea.

4. A method as in claim 1 wherein said compound is employed at a rate of from about 4 to about 256 lb. per acre.

5. A method as in claim 1 wherein said compound is employed at a rate of from about 16 to about 128 lb. per acre.

References Cited

UNITED STATES PATENTS 2,723,193  11/1955  Todd _____ 71—2.6
3,266,987   8/1966  Crowley, et al. _____ 167—53

LEWIS GOTTS, *Primary Examiner.*

S. K. ROSE, *Assistant Examiner.*